(12) United States Patent
Sugamura

(10) Patent No.: US 6,394,563 B2
(45) Date of Patent: May 28, 2002

(54) CABINET FOR ACOUSTIC EQUIPMENT OR THE LIKE

(75) Inventor: Tomokazu Sugamura, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/755,111

(22) Filed: Jan. 8, 2001

(30) Foreign Application Priority Data

Jan. 7, 2000 (JP) ................................. 2000-000029 U

(51) Int. Cl.[7] .............................................. A47B 45/00
(52) U.S. Cl. ................................. 312/257.1; 312/263
(58) Field of Search ............................. 312/263, 265.5, 312/257.1, 7.2; 348/839, 836; 220/4.28

(56) References Cited

U.S. PATENT DOCUMENTS 4,710,591 A * 12/1987 Rochester, Jr.

FOREIGN PATENT DOCUMENTS

| JP | 55-179093 | 6/1954 |
|---|---|---|
| JP | 62-172180 | 10/1987 |
| JP | 10-59359 | 3/1998 |

* cited by examiner

Primary Examiner—Janet M. Wilkens
(74) Attorney, Agent, or Firm—Crowell & Moring LLP

(57) ABSTRACT

A cabinet is formed by fitting a protruding portion 21 on a rear cabinet 2 side to an inner side of an edge portion 12 of an opening on a front cabinet 1 side. Convex portions 4 provided at a plurality of positions on the obverse surface of the protruding portion 21 form a gap between the obverse surface of the protruding portion 21 and the reverse surface of the edge portion 12 of the opening at the fitted portion. The top portion of each of the convex portion 4 is formed in a tapered or arcuate shape. The convex portion 4 may be formed of a pair of projections provided at two adjacent positions.

10 Claims, 12 Drawing Sheets

US 6,394,563 B2

CABINET FOR ACOUSTIC EQUIPMENT OR THE LIKE

BACKGROUND OF THE INVENTION

1. Field of the Invention

The present invention relates to a cabinet for acoustic equipment or the like such as a television receiver and a cassette-integrated-type radio (radio-cassette player).

2. Description of the Related Art

FIG. 11 shows a conventional cabinet for a television receiver. This cabinet is divided into a box-shaped front cabinet 1 and a box-shaped rear cabinet 2, and is formed by fitting a protruding portion 21 provided on an upper side and left and right sides of a front end of the rear cabinet 2 to the inner side of an edge portion of an opening (not shown in the drawing) at a rear end of the front cabinet 1. For this reason, the protruding portion 21 and the edge portion of the opening overlap with each other at the fitted portion. However, since synthetic resin moldings are used for both the front cabinet 1 and the rear cabinet 2, and the cabinet also functions as an acoustic box, if the protruding portion 21 is merely fitted as it is to the edge portion of the opening, the fitted portion vibrates depending on the volume of a speaker (not shown) incorporated in the cabinet, and the so-called fluttering sound occurs in consequence of the collision (contact) between the protruding portion and the edge portion of the opening, thereby possibly lowering the sound quality.

Accordingly, as shown in FIG. 11, a cushioning material 22 such as a nonwoven fabric is conventionally attached to appropriate portions or the entire portion of the protruding portion on the obverse surface side of the protruding portion 21. When the protruding portion 21 is fitted to the edge portion of the opening, the cushioning material 22 is placed between the protruding portion 21 and the edge portion 12 of the opening at the fitted portion, as shown in FIG. 12. Providing this arrangement, even if the fitted portion vibrates, since the protruding portion 21 and the edge portion 12 of the opening are prevented from coming into direct contact with each other by the cushioning material 22, situation in which the chattering sound occurs in consequence of the collision between the two members is suppressed, and jouncing the fitted portion is also suppressed.

Meanwhile, JP-A-10-59359 discloses that when a case for a vehicle-mounted electronic apparatus is formed by being divided into a lower casing body an upper casing body, a structure prevents from jouncing fitted portion of the two casing bodies. According to this publication, in a state in which one edges of two rectangular holes provided at side panels on the upper casing body side ride over semi-conical projections formed in a juxtaposed manner at two positions on side panels of the lower casing body, the other edges of these rectangular holes are separately retained. In addition, JP-A-55-179093U discloses a cabinet which is formed by fitting a projection provided on a tongue piece at a cover side to a recessed portion formed on side plates of a cabinet body. Further, JP-A-62-172180U discloses a housing for acoustic equipment or the like which is formed by fitting a projection provided on a casing side to a recessed portion provided on a cover side.

However, with the conventional cabinet described with reference to FIGS. 11 and 12, since the cushioning material 22 such as the nonwoven fabric is extra required to prevent the chattering sound at the fitted portion between the protruding portion 21 of the rear cabinet 2 and the edge portion 12 of the opening in the front cabinet 1, the cost increases correspondingly.

In addition, with the structure disclosed in JP-A-10-59359 mentioned above, since subject matter thereof is a casing for vehicle-mounted electronic equipment to which intense vibrations, such as vibrations of vehicle during running or engine vibrations, are transmitted, this publication is merely intended to suppress the jounce in the fitted portion between the lower casing body and the upper casing body as much as possible and to prevent loosening and the like from occurring in the fitted portion even if the vibrations are repeatedly transmitted. As such, no countermeasure is adopted for suppressing the occurrence of fluttering sound required for the cabinet for acoustic equipment or the like. As for the structures disclosed in JP-A-55-179093U and JP-A-62-172180U as well, these publications are merely intended to firmly join the fitted portion of the cabinet or the like, and no countermeasure is adopted for suppressing the occurrence of the aforementioned fluttering sound.

Under the above-described circumstances, the applicant integrally formed projections 23, as shown in FIG. 13 for explanation, having rectangular-shape in a front view (hereafter referred to as the "rectangular projections"), the projections 23 arranged at desired intervals at a plurality of positions on the obverse surface of the protruding portion 21 of the rear cabinet 2 side, instead of using the cushioning material 22 such as the nonwoven fabric mentioned above with reference to FIGS. 11 and 12. The applicant attempted to form a cabinet by fitting the protruding portion 21 to the inner side of the edge portion of the opening on the rear cabinet side.

FIG. 14 is an enlarged cross-sectional view, taken from the front side, of the fitted portion between the protruding portion 21 and the edge portion 12 of the opening. As shown in the drawing, in this fitted portion, the rectangular projection 23 provided on the protruding portion 21 is placed between the protruding portion 21 and the edge portion 12 of the opening, and whereby a gap 3 is formed between an obverse surface 21a of the protruding portion 21 and a rear surface 12a of the edge portion 12 of the opening. It was found that when the fitted portion has this structure, even if the fitted portion vibrates due to sound from a speaker, since the contact between the protruding portion 21 and the edge portion 12 of the opening is prevented by virtue of the gap 3, the occurrence of the fluttering sound in consequence of the collision between the protruding portion 21 and the edge portion 12 of the opening can be suppressed. It was also found that when mutual interval between adjacent ones of the rectangular projections 23 is set to be quite a bit wide, warping deformation such as inward drooping of the edge portion 12 of the opening is difficult to occur, and that an action of suppressing the fluttering sound by virtue of the gap 3 can be demonstrated. However, since a flat top surface 23a of the rectangular projection 23 is in surface contact and is superposed with the reverse surface 12a of the edge portion 12 of the opening, it was found that relatively large fluttering sound can occur in consequence of the collision between the rectangular projection 23 and the edge portion 12 of the opening.

The invention has been devised in view of the above-described circumstances.

An object of the invention is to provide a cabinet for acoustic equipment or the like which enables to substantially suppress the occurrence of the fluttering sound at the aforementioned fitted portion despite the fact that the cushioning material such as the nonwoven fabric is not required.

Another object of the invention is to provide a cabinet for acoustic equipment or the like in which the jounce is difficult to occur at the aforementioned fitted portion.

Still another object of the invention is to provide a cabinet for acoustic equipment or the like which enables to facilitate an operation of fitting the aforementioned protruding portion to the edge portion of the opening.

SUMMARY OF THE INVENTION

A cabinet for acoustic equipment or the like according to the invention is formed by fitting a protruding portion provided on one of a front cabinet and a rear cabinet to an inner side of an edge portion of an opening on the other of the front cabinet and the rear cabinet.

To facilitate an understanding of explanation, a description will be given of a cabinet in which one cabinet is the rear cabinet, and the protruding portion is provided on the rear cabinet, while the other cabinet is the front cabinet. The cabinet is formed by fitting the protruding portion to the inner side of an edge portion of an opening of the front cabinet.

In the cabinet in accordance with the invention, convex portions provided at a plurality of positions on one of the obverse surface of the protruding portion and the reverse surface of the edge portion of the opening are placed between the protruding portion and the edge portion of the opening to form a gap between the obverse surface of the protruding portion and the reverse surface of the edge portion of the opening. For this reason, as can be appreciated from the description with reference to FIG. 14, even if the fitted portion between the protruding portion and the edge portion of the opening vibrates due to sound from a speaker, the gap prevents the protruding portion from contacting the edge portion of the opening with each other, thereby suppressing occurrence of the fluttering sound in consequence of the collision between the protruding portion and the edge portion of the opening.

In the invention, in addition to the above-described arrangement, a top portion of each of the convex portions is formed in a tapered or arcuate shape. If the top portion of each of the convex portions is thus formed in the tapered or arcuate shape, since the superposed area, between each of the top portions of the convex portions and the protruding portion or the edge portion of the opening where the top portions are in contact, becomes extremely narrower than the case described with reference to FIG. 14, the fluttering sound does not occur at the superposed portions, or even if the fluttering sound occurs, the fluttering sound is suppressed substantially to such an extent that degradation of sound quality hardly occurs.

Each of the convex portions is preferably provided integrally with the obverse surface of the protruding portion. According to this arrangement, the protruding portion and the convex portions can be easily molded integrally. Namely, in a case where the convex portions are provided integrally with the reverse surface of the edge portion of the opening, the convex portions project to the inner side of the edge portion of the opening when the front cabinet is molded of synthetic resin, thereby making it difficult to releasing a mold. However, if the convex portions are provided integrally with the obverse surface of the protruding portion, the factor for making it difficult to release the mold is eliminated. As for this aspect, a more detailed description will be given in the embodiment described later.

In this invention, as the above described, the top portion of each of the convex portions needs to be formed in a tapered or arcuate shape. To satisfy this requirement, each of the convex portions is preferably formed in a backward and forward elongated linear shape or in a spherical shape, for example.

In this invention, it is preferred that each of the convex portions be formed of a pair of projections provided at two adjacent positions, and that the top portion of each of the projections forming the pair of projections, the top portion is formed in the tapered or arcuate shape. As for an advantage of adopting this arrangement, a more detailed description will be given in the embodiment described later. Incidentally, in this case as well, each of the projections is preferably formed in a backward and forward elongated linear shape or in a spherical shape.

In this invention, the convex portions are preferably provided at the plurality of positions on the obverse surface of the protruding portion at intervals which do not cause the edge portion of the opening to droop down. According to this arrangement, a situation does not occur in which the edge portion of the opening droops down between adjacent ones of the convex portions and approaches the protruding portion, and the drooping portions collide with the protruding portion to generate the fluttering sound.

In this invention, it is preferred that the protruding portion is provided over upper, left, and right sides of one of the front cabinet and the rear cabinet, and that the convex portions are correspondingly arranged at least two positions on each of the upper, left, and right sides, and rib-like projecting pieces which are superposed on the reverse surface of the protruding portion at a position intermediate between the convex portions arranged at the two positions are provided on the other of the front cabinet and the rear cabinets. According to this arrangement, the rib-like projecting pieces can prevent from the protruding portion from being inwardly warped and deformed due to drooping down or the like. Consequently, it is possible to prevent a situation in which the protruding portion is inwardly warped and deformed to detach the convex portions from the edge portion of the opening. This contributes to suppressing occurrence of jounce in the fitted portion between the protruding portion and the edge portion of the opening.

In this invention, it is preferred that each of the rib-like protruding pieces has a function of sliding on the reverse surface of the projection portion while outwardly warping and deforming the protruding portion to guide the protruding portion to the inner side of the edge portion of the opening when the protruding portion is fitted to the inner side of the edge portion of the opening, and the rib-like projecting pieces outwardly press the protruding portion, and whereby the protruding portion is brought into contact with the reverse surface of the edge portion of the opening. According to this arrangement, since the protruding portion and the edge portion of the opening are slightly tensioned, the vibration itself of the fitting portion, which causes the occurrence of the fluttering sound, hardly occurs. In addition, since the situation in which each of the convex portions is detached from the edge portion of the opening due to the above-described warping deformation of the protruding portion is prevented more reliably, and the jounce in the fitting portion between the protruding portion and the edge portion of the opening is suppressed more reliably. Further, operating efficiency at the time of fitting the protruding portion to the edge portion of the opening is improved. This action of improving the operating efficiency is further promoted if a guide surface slanted rearward upward is provided on a tip of each of the convex portions.

In this invention, both of the front cabinet and the rear cabinet are preferably made of synthetic resin moldings.

Here, a description has been given of the cabinet in which one cabinet is the rear cabinet, and the protruding portion is provided on that rear cabinet, while the other cabinet is the front cabinet, and the cabinet is formed by fitting the protruding portion to the inner side of the edge portion of the opening of the front cabinet. However, the same also holds true with the cabinet in which one cabinet is the front cabinet, and the protruding portion is provided on that front cabinet, while the other cabinet is the rear cabinet, and the cabinet is formed by fitting the protruding portion to the inner side of the edge portion of the opening of the rear cabinet

DETAILED DESCRIPTION OF THE INVENTION

Figure 1:
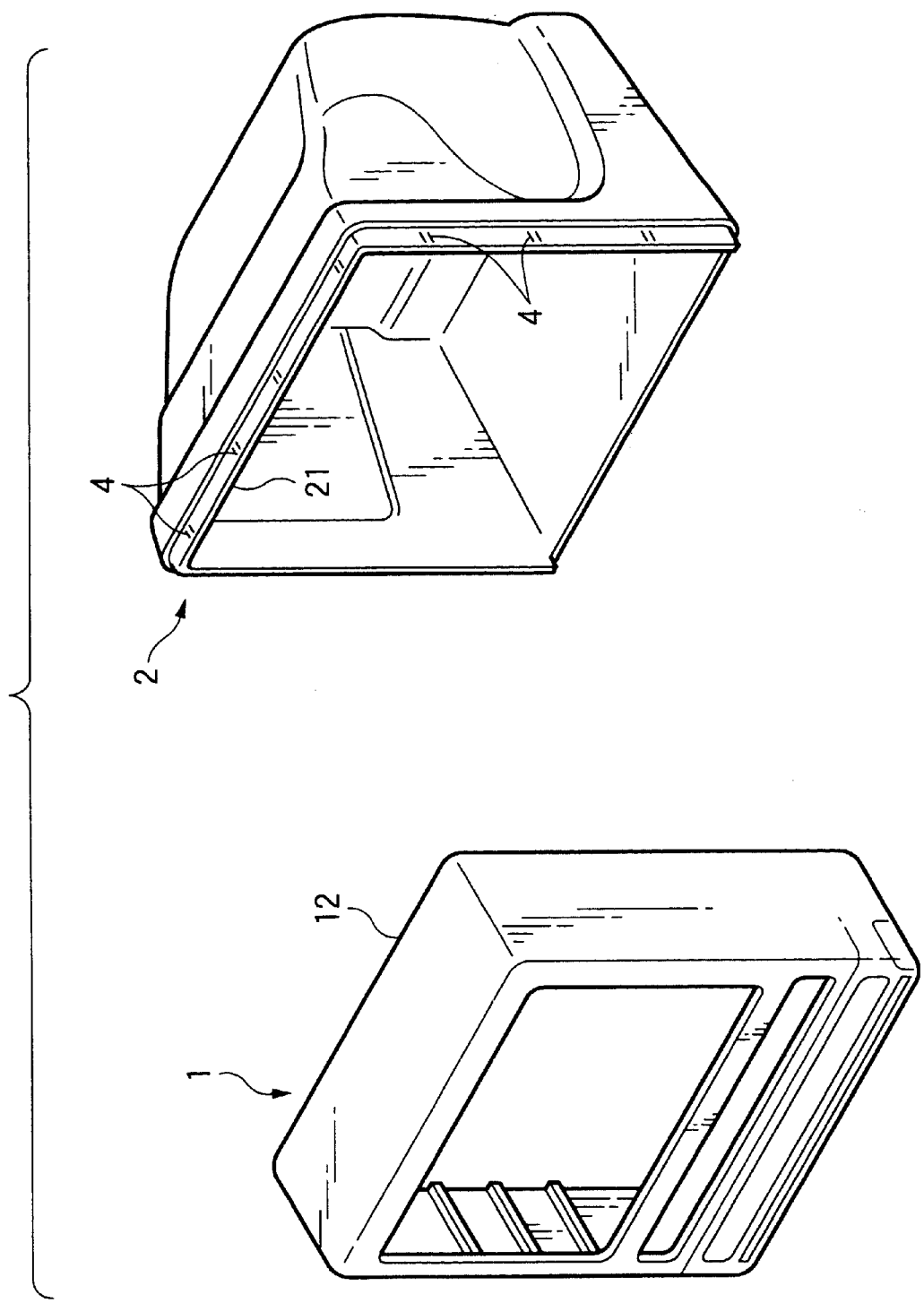
FIG. 1 is a schematic exploded perspective view of a cabinet for acoustic equipment or the like in accordance with an embodiment of the invention.

FIG. 1 is a schematic exploded perspective view of a cabinet for acoustic equipment or the like in accordance with an embodiment of the invention. As shown in the drawing, this cabinet is formed by combining a box-shaped front cabinet 1 and a box-shaped rear cabinet 2. Both the front cabinet 1 and the rear cabinet 2 are made of synthetic resin moldings, and is adapted such that a protruding portion 21 provided on an upper side, left side, and right side of a front end of the rear cabinet 2 is fitted to the inner side of an edge portion (not appearing in the drawing) of an opening a rear end of the front cabinet 1.

Figure 2:
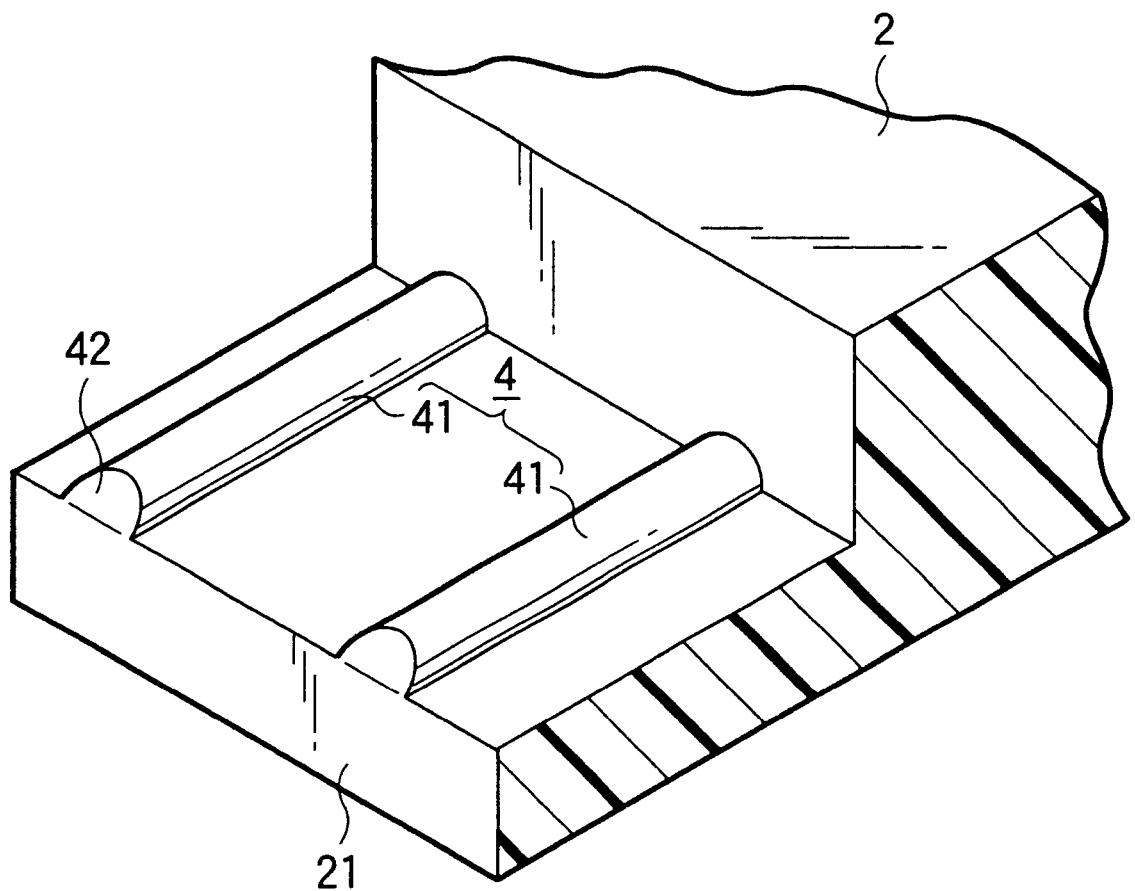
FIG. 2 is an enlarged schematic perspective view of an essential portion of FIG. 1.

FIG. 2 is an enlarged schematic perspective view of an essential portion of FIG. 1. As shown in FIG. 1, convex portions 4 are provided on an obverse surface of the protruding portion 21 at a plurality of positions spaced apart at desired intervals. As shown in FIG. 2, the each convex portions 4 are formed by a pair of projections 41, 41 (a projection pair) provided at two adjacent positions, and each projection 41 is formed in a linear shape which is elongated in a transverse direction and has a length corresponding to a length of the protruding portion 21 projecting from the rear cabinet 2, a top portion thereof formed in a shape of a circular arc. Further, guide surfaces 42 rearwardly upwardly slanted are provided at tips of the projections 41, respectively. This guide surface 42 may be a flat slanted surface or an arcuate surface.

Figure 3:
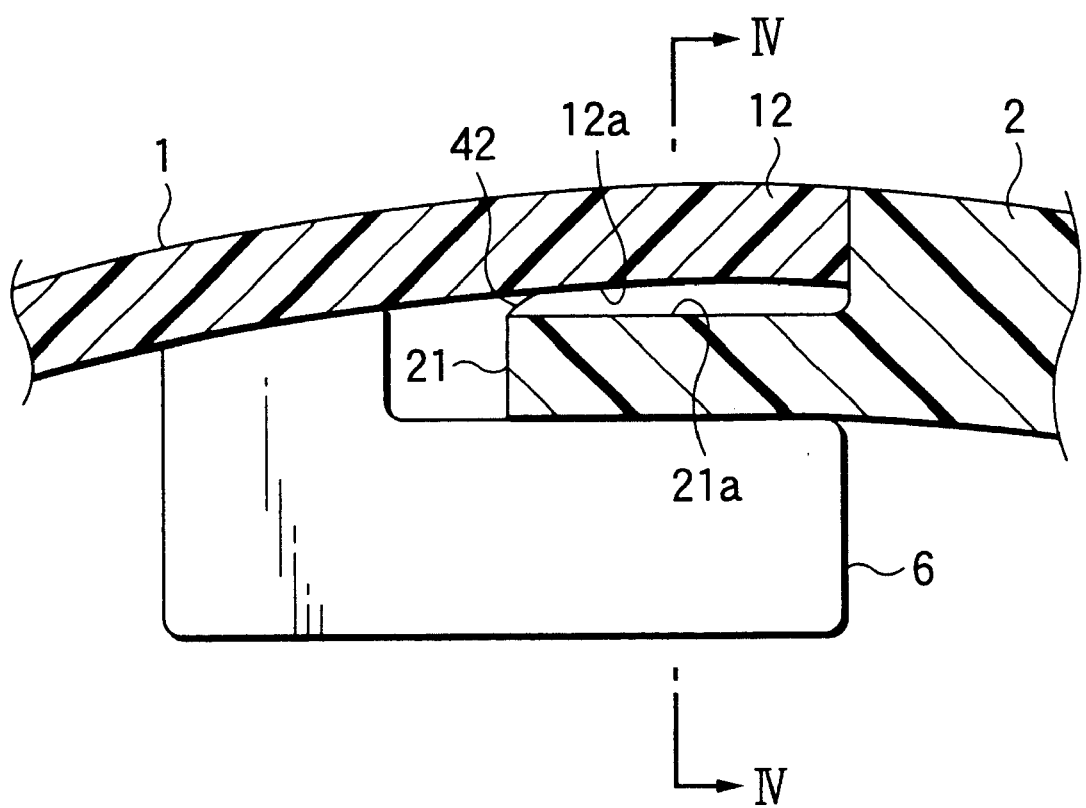
FIG. 3 is a vertical enlarged cross-sectional view of a fitted portion between a protruding portion and an edge portion of an opening.
Figure 4:
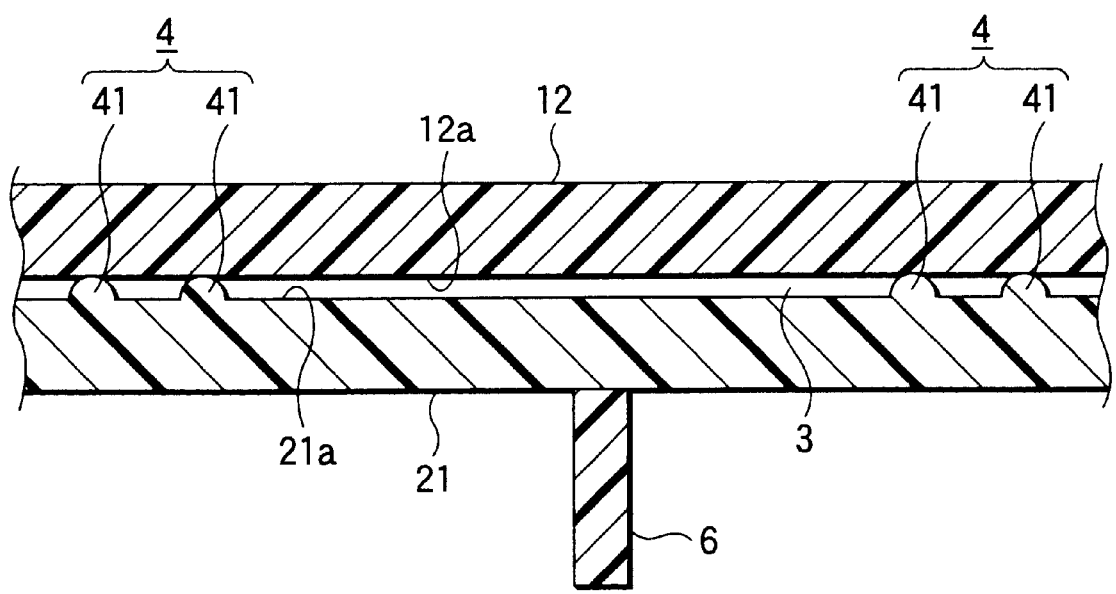
FIG. 4 is a vertical front cross-sectional view taken along line IV—IV of FIG. 3.

FIG. 3 is a vertical enlarged cross-sectional side view of the fitted portion in a state in which the protruding portion 21 on the rear cabinet 2 side is fitted to an edge portion 12 of an opening on the front cabinet 1 side, and FIG. 4 is a vertical front cross-sectional view taken along line IV—IV of FIG. 3.

As shown in the drawings, each convex portion 4 formed by the pair of projections 41 integrally provided with the protruding portion 21 is placed between the protruding portion 21 and the edge portion 12 of the opening, and a gap 3 of a size commensurate with the height of the projections 41 is formed between an obverse surface 21a of the protruding portion 21 and a reverse surface 12a of the edge portion 12 of the opening. In addition, the arcuate top portions of the projections 41 are in contact with the reverse surface 12a of the edge portion 12 of the opening. For this reason, the contact portions of the two members are linear, and the superposed area is extremely narrower than the case described with reference to FIG. 14.

When the fitted portion between the protruding portion 21 and the edge portion 12 of the opening has this structure, even if the fitted portion vibrates due to sound from a speaker, contact or collision between the protruding portion 21 and the edge portion 12 of the opening is prevented by virtue of the gap 3. In addition, since the superposed area between each of the top portions of the pair of projections 41, 41 and the edge portion 12 of the opening with which the top portions are in contact is very narrow, the fluttering sound does not occur at the superposed portions, or even if the fluttering sound occurs at the superposed portions, the fluttering sound is suppressed substantially to such an extent that degradation of sound quality hardly occurs. In this embodiment, the plurality of convex portions 4 each formed by the pair of projections 41, 41 are arranged at intervals not to cause inwardly warping deformation such as drooping. Specifically, the convex portions 4 are arranged on the protruding portion 21 at positions corresponding to at least two positions of each of an upper side, left side and right side of the rear cabinet 2. For this reason, the action of suppressing the fluttering sound is reliably demonstrated.

In this embodiment, as shown in FIGS. 3 and 4, rib-like projecting pieces 6 provided integrally on the front cabinet 1 side are superposed on the reverse surface of the protruding portion 21 with each other at a position between the convex portions 4, 4 provided at two positions on the protruding portion 21. For this reason, the situation in which the protruding portion 21 is inwardly warped and deformed due to drooping can be prevented by the rib-like projecting pieces 6. Consequently, it is possible to prevent a situation in which the protruding portion 21 is inwardly warped and deformed from detaching the projections 41 of the convex portions 4 from the edge portion 12 of the opening, and whereby it is possible to suppress the occurrence of jounce in the fitted portion between the protruding portion 21 and the edge portion 12 of the opening.

Figure 5:
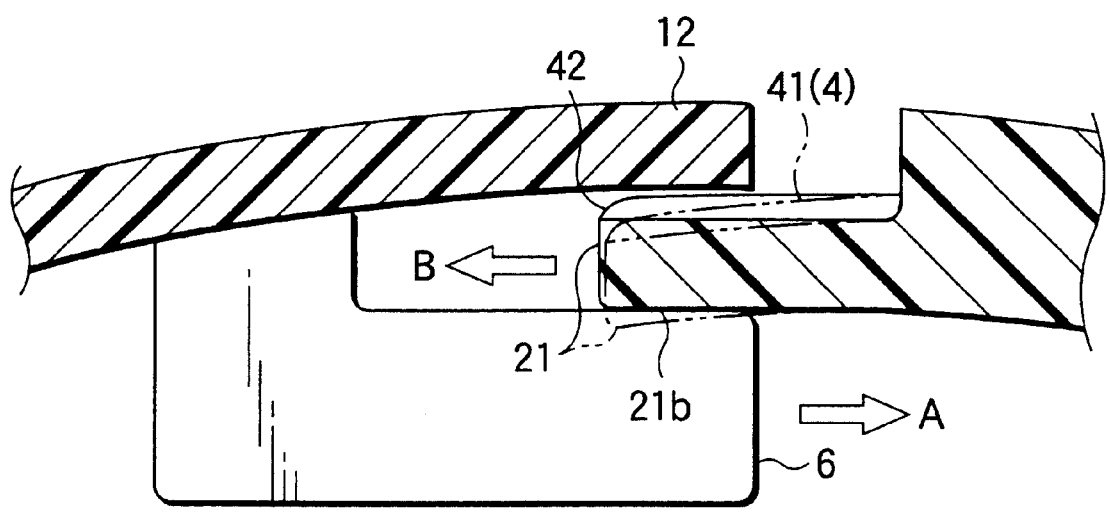
FIG. 5 is a vertical side cross-sectional view illustrating in an explanatory manner a state of fitting operation.

FIG. 5 is a vertical side cross-sectional view illustrating in an explanatory manner a state of operation when the protruding portion 21 is fitted to the edge portion 12 of the opening. As shown in the drawing, when the protruding portion 21 is fitted to the inner side of the edge portion 12 of the opening, the rib-like projecting piece 6 is fitted to the reverse side of the protruding portion 21 in a direction of arrow A, and while outwardly warping and deforming the protruding portion 21, the rib-like projecting piece 6 displays function of sliding on a reverse surface 21b of the protruding portion 21 to guide the protruding portion 21 to the inner side of the edge portion 12 of the opening in a direction of an arrow B. For this reason, after fitting, the rib-like projecting piece 6 presses the protruding portion 21 in an outward direction, and the pair of projections 41, 41 are brought into contact with the reverse surface of the edge portion 12 of the opening. If this structure is adopted, since the protruding portion 21 and the edge portion 12 of the opening are slightly tensioned, the vibration itself of the fitting portion, which is source of the fluttering sound, is difficult to occur. In addition, since it is prevented more reliably that each convex portion 4 formed of the pair of projections 41, 41 is detached from the edge portion 12 of the opening due to the above-described warping deformation of the protruding portion 21, the jounce in the fitting portion between the protruding portion 21 and the edge portion 12 of the opening is suppressed more reliably. Further, since the protruding portion 21 slides on the rib-like projecting piece 6 and is guided to the inner side of the edge portion 12 of the opening, the operating efficiency, at the time of fitting the protruding portion 21 to the edge portion 12 of the opening, is also improved. Furthermore, in an early stage of fitting the protruding portion 21 to the edge portion 12 of the opening, the guide surfaces 42, 42 provided at the tips of the pair of projections 41, 41 slide on the rear end of the edge portion 12 of the opening to guide the protruding portion 21 to the inner side of the edge portion 12 of the opening, so that the aforementioned operating efficiency in fitting is further improved.

Figure 6:
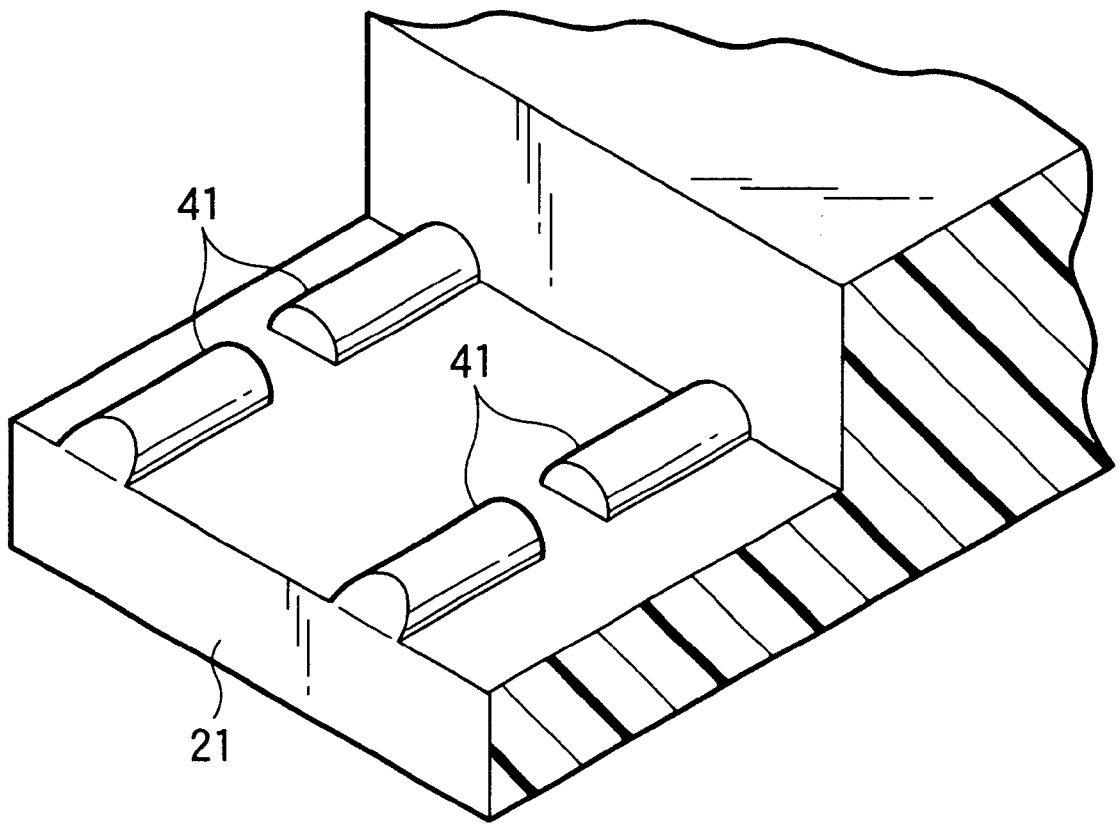
FIG. 6 is an enlarged schematic perspective view of an essential portion of a modification of a pair of projections.
Figure 7:
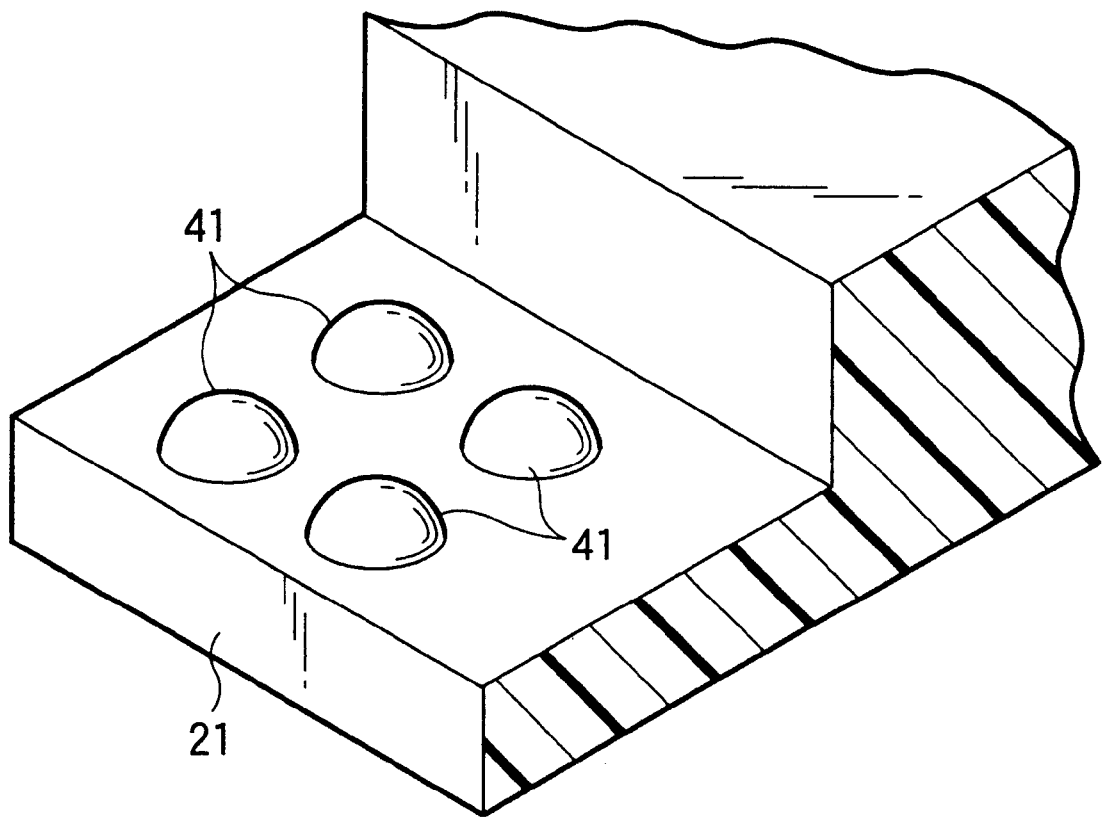
FIG. 7 is an enlarged schematic perspective view of an essential portion of another modification of the pair of projections.

Although, in this embodiment, a description has been given of the case in which the pair of projections 41, 41 are formed linearly on the obverse surface of the protruding portion 21, the shape of the pair of projections 41 may be one in which longitudinally intermediate portions of the linear projections 41, 41 are cut away and are split into front and rear portions, as shown in FIG. 6, or one in which the pair of projections 41 are formed in spherical shapes, as shown in FIG. 7. In these cases, since the superposed area between the top portion of each of the projections 41, 41 and the edge portions 12 of the opening at the fitted portion becomes much smaller than that described with reference to FIGS. 1 to 4, the occurrence of the fluttering sound at the superposed portions is suppressed by that margin. In short, the shape of the pair of projections 41, 41 for forming each convex portion 4 can have any shape so long as top portions thereof are formed in a tapered shape or an arcuate shape.

Figure 8:
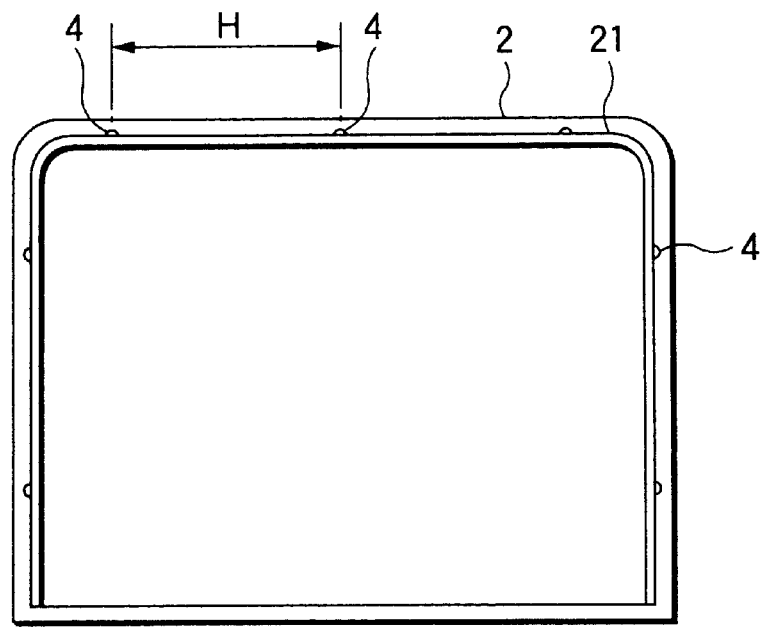
FIG. 8 is a schematic elevational view of a rear cabinet on which each convex portion is formed by a single projection.

Incidentally, to form the gap 3 between the protruding portion 21 and the edge portion 12 of the opening to prevent contacting both of them with each other at the fitted portion, as described above embodiment, apart from forming the convex portions 4 of the pairs of projections 41, convex portions 4 each formed of a single projection may be provided at a plurality of positions spaced apart at desired intervals on the surface of the protruding portion 21, as shown in a schematic elevational view in FIG. 8. Accordingly, the cabinet having such convex portions 4 is also included in the scope of the invention.

Figure 9:
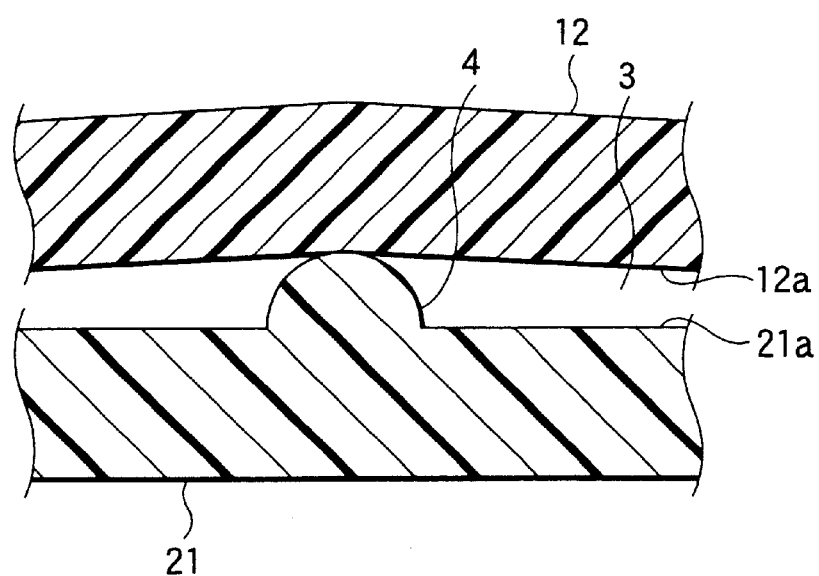
FIG. 9 is an enlarged vertical front cross-sectional view of the essential portion of the fitting portion between the edge portion of the opening and the protruding portion having convex portions each formed by the single projection.

However, in a case where the convex portions 4 each formed of a single projection are provided at a plurality of positions on the obverse surface of the protruding portion 21, if mutual interval H between adjacent ones of the convex portions 4 is excessively large, there is a possibility of occurrence of a situation in which the edge portion 12 of the opening droops down in a direction of approaching the protruding portion 21 on both sides of portion where the edge portion 12 of the opening is superposed on the top portion of the convex portion 4 in a contacting state and is supported by the top portion, as in an enlarged cross-sectional view of the fitted portion shown in FIG. 9. If such a situation occurs, the gap 3 between the obverse surface 21a of the protruding portion 21 and the reverse surface 12a of the edge portion 12 of the opening becomes narrow, and there arises the possibility of the fluttering sound occurring as the protruding portion 21 and the edge portion 12 of the opening collide with each other at the portion where the gap 3 is narrow. To overcome this aspect, it suffices if the mutual interval H between adjacent ones of the convex portions 4 is narrowed to prevent the edge portion 12 of the opening from drooping down, such as one shown in FIG. 9.

However, if the mutual interval H between the convex portions 4 is narrowed, the required number of the convex portions 4 provided on the protruding portion 21 increases, so that when the protruding portion 21 is fitted to the edge portion 12 of the opening, the tips of a large number of the convex portions 4 are brought into contact with the edge portion 12 of the opening, which constitutes a factor for lowering the operating efficiency in fitting.

Accordingly, in the embodiment described with reference to FIGS. 1 to 5, each convex portion 4 includes the pair of projections 41, 41 at two adjacent positions. It was confirmed that when this arrangement is provided, even if the mutual interval between the convex portions 4 formed of the pair of projections 41, 41 is made wide, the drooping down of the edge portion 12 of the opening as shown in FIG. 9 hardly occurs. In addition, when each convex portion 4 includes the pair of projections 41, 41, although the number of the projections 41 increases correspondingly, since the mutual interval between the pair of projections 41 is very narrow, the pairs of projections 41, 41 are easily fitted to the inner side of the edge portion 12 of the opening when the protruding portion 21 is fitted to the edge portion 12 of the opening, thereby ensuring satisfactory operating efficiency in fitting.

Figure 10:
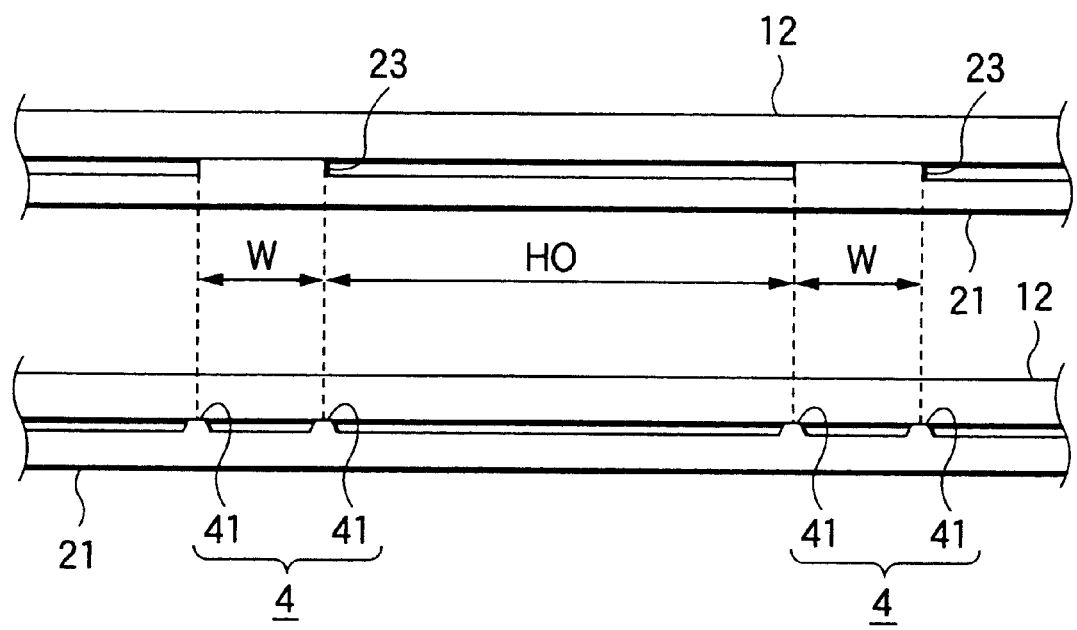
FIG. 10 is an explanatory view showing a comparison between a case in which rectangular projections are adopted and a case in which each convex portion is formed by a pair of projections.
Figure 11:
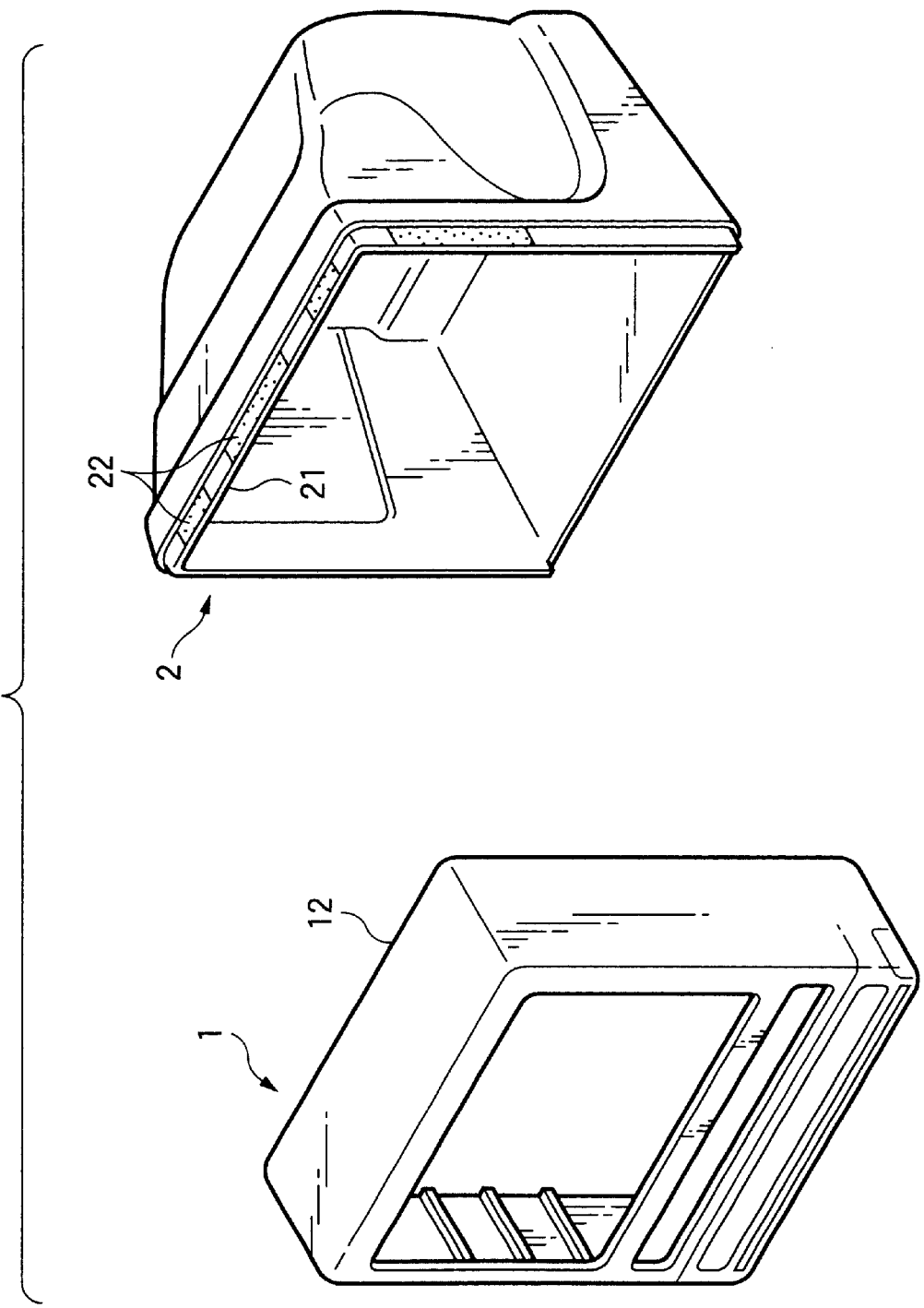
FIG. 11 is a schematic exploded perspective view of a conventional cabinet for a television receiver.
Figure 12:
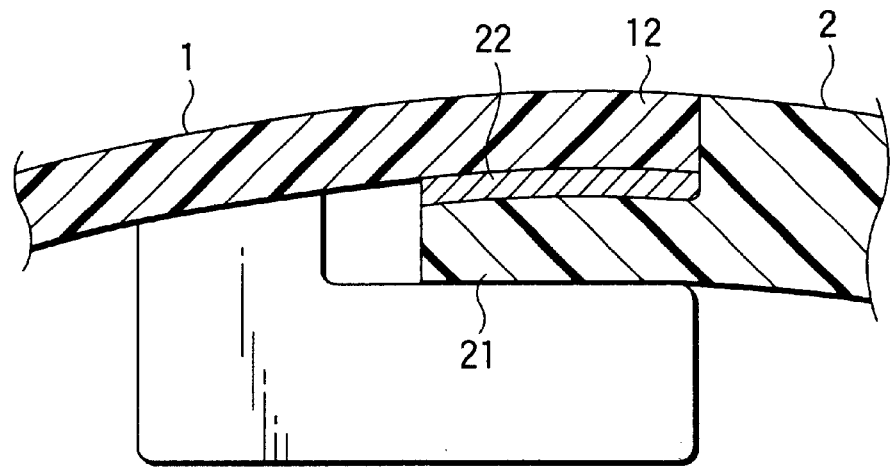
FIG. 12 is an enlarged vertical side cross-sectional view of a fitted portion of the conventional cabinet.
Figure 13:
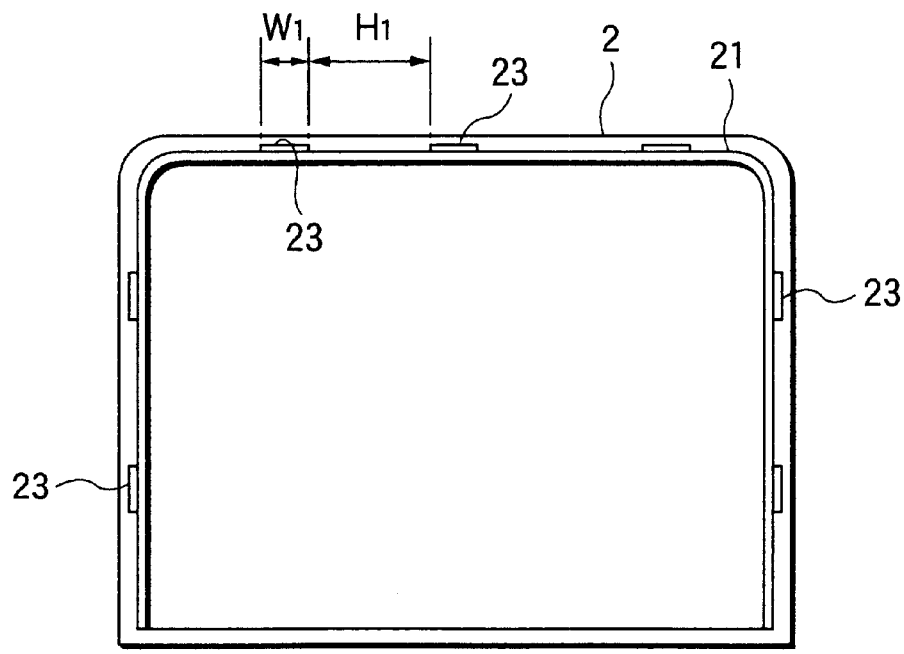
FIG. 13 is a schematic elevational view of a rear cabinet in accordance with a comparative example.
Figure 14:
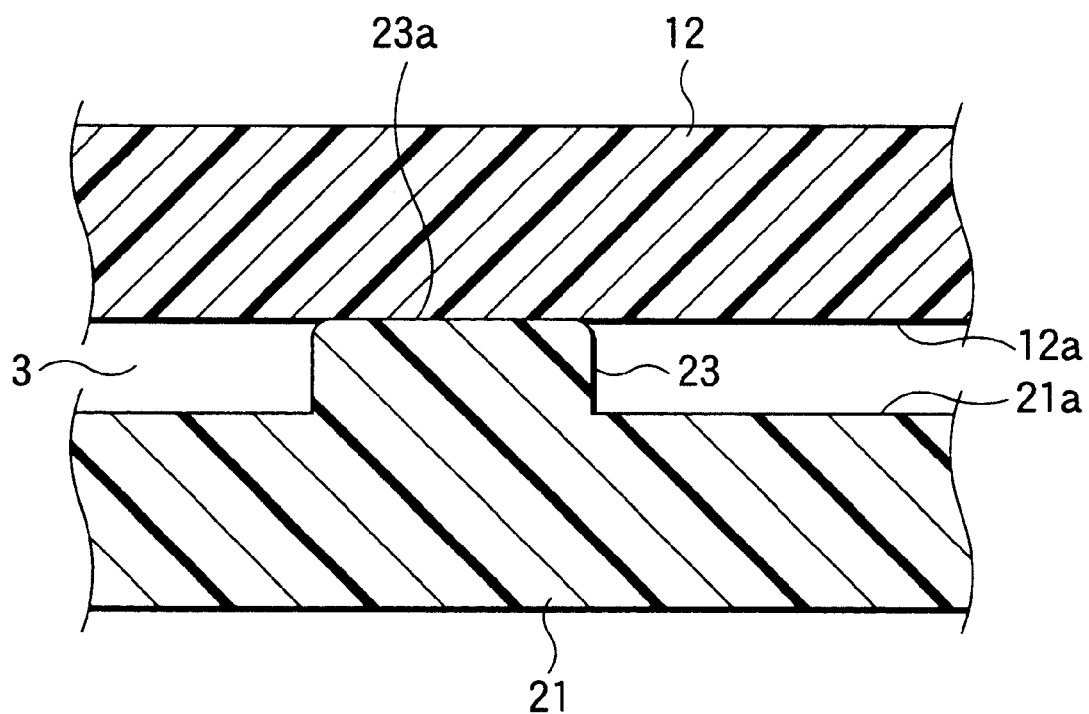
FIG. 14 is an enlarged vertical front cross-sectional view of the fitted portion in accordance with the comparative example.

FIG. 10 shows a comparison between the case where the rectangular projections 23 described with reference to FIGS. 13 and 14 are adopted and the case where each convex portion 4 includes the pair of projections 41, 41. As can be seen from the drawing, mutual interval W between the pair of projections 41 is set to be identical to transverse width W1 in a horizontal direction of the rectangular projection 23 shown in FIG. 13. In addition, mutual interval H0 between the convex portions 4 each formed of the pair of projections 41, 41 is set to be identical to mutual interval Hi between the rectangular projections 23 shown in FIG. 13 (H0=H1) When this arrangement is provided, in the case where the inward warping deformation of the edge portion 12 of the opening does not occur by adopting the rectangular projections 23 as described with reference to FIGS. 13 and 14, the inward warping deformation of the edge portion 12 of the opening does not occur in the case where each convex portion 4 includes the pair of projections 41, 41, thereby allowing action of suppressing the fluttering sound by virtue of the gap 3 to be displayed satisfactorily. Moreover, since each convex portion 4 includes the pair of projections 41, 41 spaced apart at an interval, the superposed area between the convex portion 4 and the edge portion 12 of the opening becomes extremely smaller than the case of the rectangular projection 23, and the action of suppressing the fluttering sound is demonstrated remarkably at the superposed portion. Incidentally, in a case where the thickness of the edge portion 12 of the opening is 2 to 3 mm and the thickness of the protruding portion 21 is about 1 mm, if the mutual interval between the top portions of the pair of projections 41, 41 for forming one convex portion 4 is set to 10 mm or thereabouts, the effect of suppressing the fluttering sound is demonstrated remarkably, the operating efficiency in fitting is satisfactory, and the action of preventing jounce in the fitted portion is exhibited remarkably.

Although, in this embodiment, the protruding portion 21 is provided on the rear cabinet 2 side and the edge portion 12 of the opening is provided on the front cabinet 1 side, the protruding portion may be provided on the front cabinet side, and the edge portion of the opening may be provided on the rear cabinet side. In addition, although the convex portions 4 are provided on the obverse surface of the protruding portion 21, the convex portions 4 may be provided on the reverse surface of the edge portion 12 of the opening.

As described above, in accordance with the invention, since the fluttering sound at the fitted portion between the protruding portion and the edge portion of the opening is suppressed or overcome without using a cushioning material such as a nonwoven fabric, it becomes unnecessary to use the cushioning material for improving the sound quality, and a reduction of cost can be easily attained correspondingly. Further, the jounce at the fitted portion hardly occurs despite the fact that the operating efficiency in the fitting between the protruding portion and the edge portion of the opening is improved. From this fact as well, it is possible to easily attain a reduction of cost.

What is claimed is:

1. A cabinet for acoustic equipment, the cabinet comprising:

a first cabinet;

a second cabinet having an opening covered by the first cabinet;

a protruding portion disposed in an edge portion of the first cabinet, the protruding portion of the first cabinet engaged with an inner edge portion of the second cabinet; and a plurality of convex portions disposed on one of an outer surface of the protruding portions and the inner edge portion of the second cabinet, the plurality of convex portion sandwiched between the outer surface of the protruding portion and the inner edge portion of the second cabinet to form a plurality of clearances between the outer surface of the protruding portions and the inner edge portion of the second cabinet, wherein a top of each of the plurality of convex portions is formed in a tapered or arcuate shape.

2. The cabinet for acoustic equipment according to claim 1, wherein the convex portions are provided integrally with the outer surface of the protruding portion.

3. The cabinet for acoustic equipment according to claim 2, wherein the plurality of convex portions are provided at the plurality of positions on the outer surface of the protruding portion at intervals preventing the edge portion of the opening from drooping down.

4. The cabinet for acoustic equipment according to claim 1, wherein the convex portions are formed in a backward and forward elongated linear shape or in a spherical shape.

5. The cabinet for acoustic equipment according to claim 1, wherein each of the convex portions includes a pair of projections provided at two adjacent positions, and a top portion of each of the pair of projections is formed in a tapered or arcuate shape.

6. The cabinet for acoustic equipment according to claim 5, wherein each of the projections is formed in a backward and forward elongated linear shape or in a spherical shape.

7. The cabinet for acoustic equipment according to claim 1, wherein the protruding portion is provided over upper, left, and right sides of the first cabinet;

the convex portions are correspondingly arranged at least two positions on each of the upper, left, and right sides; and rib projecting pieces are superposed on the reverse surface of the protruding portion at a position intermediate between the convex portions arranged at the two positions, the rib projecting pieces are provided on the second cabinet.

8. The cabinet for acoustic equipment according to claim 7, wherein each of the rib protruding pieces has a function of sliding on the reverse surface of the projection portion to guide the protruding portion to the inner side of the edge portion of the opening while outwardly warping and deforming the protruding portion when the protruding portion is fitted to the inner side of the edge portion of the opening, and the rib projecting pieces outwardly press the protruding portion, and whereby the protruding portion is brought into contact with the reverse surface of the edge portion of the opening.

9. The cabinet for acoustic equipment according to 8, wherein a guide surface slanted rearward upward is formed on a tip of each of the convex portions.

10. The cabinet for acoustic equipment according to claim 1, wherein the first cabinet and the second cabinet are made of synthetic resin moldings.

\* \* \* \* \*